United States Patent [19]

Lyon

[11] 4,158,615
[45] Jun. 19, 1979

[54] ISOTOPE SEPARATION PROCESS

[75] Inventor: Richard K. Lyon, Fanwood, N.J.

[73] Assignee: Exxon Research & Engineering Co., Florham Park, N.J.

[21] Appl. No.: 796,031

[22] Filed: May 11, 1977

Related U.S. Application Data

[63] Continuation of Ser. No. 612,707, Sep. 12, 1975, abandoned.

[51] Int. Cl.² ............................................. B01J 1/10
[52] U.S. Cl. ..................... 204/157.1 R; 204/DIG. 11
[58] Field of Search ................. 204/157.1 R, DIG. 11

[56] References Cited

U.S. PATENT DOCUMENTS 3,937,956  2/1976  Lyon .............................. 204/157.1 R

OTHER PUBLICATIONS

Ambartzumian et al., Chemical Physics Letters, vol. 25, No. 4, (Apr. 15, 1974), pp. 515–518.
Ambartzumian et al., JETP Letters, vol. 21 (Mar. 20, 1975), pp. 375–378.

Primary Examiner—Howard S. Williams
Attorney, Agent, or Firm—R. J. Baran; R. I. Samuel

[57] ABSTRACT

The instant invention relates to a process for separating a material into two or more parts in each of which the abundances of the isotopes of a given element differ from the abundances of the isotopes of the same material in said material. More particularly, the invention relates to a method for the isotopically selective excitation of gas phase molecules by multiple infrared photon absorption after which more of the excited molecules than nonexcited molecules are converted to a chemically different form which may be separated by means known in the art. This invention is useful for, but not limited to, the separation of the principal isotopes of uranium.

8 Claims, 1 Drawing Figure

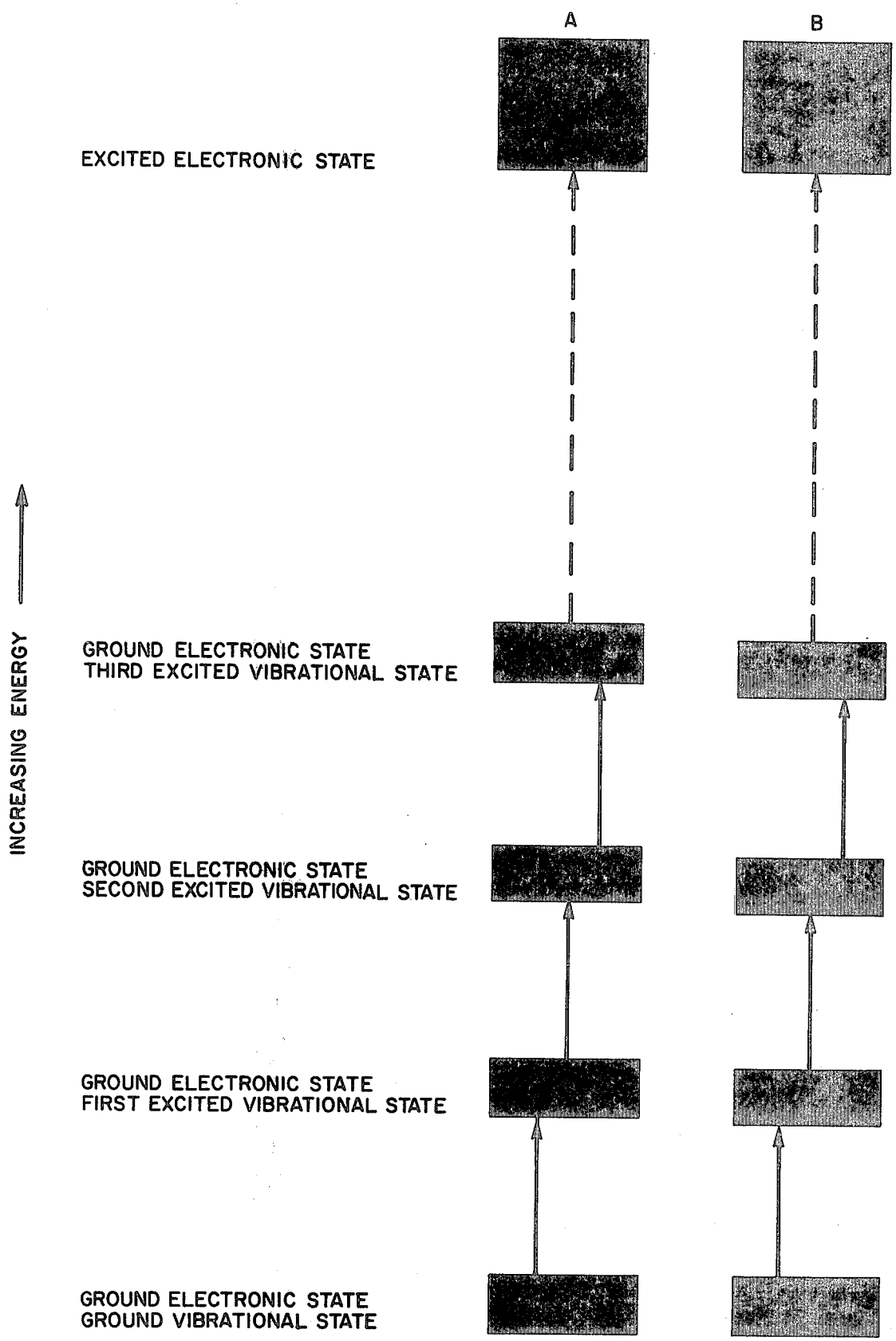

ISOTOPE SEPARATION PROCESS

CROSS REFERENCE TO RELATED APPLICATIONS

This is a continuation of application Ser. No. 612,707, filed Sept. 12, 1975 now abandoned.

This application is related to copending application, U.S. Ser. No. 408,669, filed on Oct. 23, 1973, in the name of R. K. Lyon, now U.S. Pat. No. 3,937,956, and the Continuation-in-part thereof, U.S. Ser. No. 570,849 filed April 23, 1975, now U.S. Pat. No. 4,003,809, and the Continuation-in-Part thereof, U.S. Ser. No. 606,508 filed on Aug. 21, 1975, now abandoned. It should be noted that the benefit of the filing dates of the above applications is not being claimed. This application, like UnS. Ser. No. 408,669 and said Continuations-in-part thereof, is related to isotope separation processes wherein, in a first step, multiple IR photon absorption is utilized to selectively excite one isotope of an isotopic mixture, and said excited isotope is converted second step, to a form which can be recovered from said mixture. This application differs from U.S. Ser. No. 408,669, however, in that the multiple infrared photon absorption is achieved by different means as discussed below.

FIELD OF THE INVENTION

The instant invention relates to a process for separating a material into two or more parts in each of which the abundances of the isotope of a given element differ from the abundances of the isotopes of the same material in said material. More particularly, the invention relates to a method for the isotopically selective excitation of gas phase molecules by multiple infrared photon absorption after which more of the excited molecules than nonexcited molecules are converted to a chemically different form which may be separated by means known in the art. This invention is useful for, but not limited to, the separation of the principal isotopes of uranium.

BACKGROUND OF THE PRIOR ART

In order that the instant invention may be clearly understood, it is useful to review the prior art relating to photochemical isotope separation. U.S. Pat. No. 2,713,025 and British Pat. No. 1,237,474 are good examples of processes for the photochemical separation of the isotopes of mercury. The first requirement for photochemical isotope separation is that one finds conditions such that atoms or molecules of one isotope of a given element absorb light more strongly than do atoms or molecules of another isotope of said element. Mercury is a volatile metal and readily forms a vapor of atoms. Said atoms absorb ultraviolet light at 2537 Å. The absorption line of $Hg^{202}$ is displaced by about 0.01 Å with respect to the absorption line of $Hg^{200}$. Since the absorption lines are extremely narrow, one may by use of a light in a critically narrow wavelength region excite either $Hg^{200}$ or $Hg^{202}$.

The second requirement for a photochemical isotope separation is that those atoms or molecules which are excited by light undergo some process which the atoms or molecules which have not been excited do not undergo, or at least do not undergo as rapidly. A quantum of 2537 Å ultraviolet light imparts an excitation of 112.7 Kcal/mole to the mercury atom which absorbs it. The number of mercury atoms which at room temperature are thermally excited to this energy is vanishingly small, hence the atoms excited by light are not diluted by atoms excited by thermal means. Atoms of this high excitation readily undergo reactions with $H_2O$ (as taught in the U.S. patent) or with $O_2$, HCl or butadiene (as taught in the British patent), said reactions not occurring at room temperature with unexcited mercury.

Uranium, however, is a highly refractory metal, boiling only at extremely high temperatures. Thus, use of the above-described process with uranium atoms instead of mercury involves obvious difficulties. The most volatile form of uranium is $UF_6$. $U^{235}F_6$ and $U^{238}F_6$ both absorb ultraviolet light and do so to exactly the same extent at all wavelengths in the UV; hence, UV excitation of $UF_6$ does not satisfy the first requirement of photochemical isotope separation. However, $UF_6$ will also absorb infrared light in the region around 626 $cm^{-1}$ (the $V_3$ band) and 189 $cm^{-1}$ (the $V_4$ band). Both the $V_3$ and $V_4$ bands of $U^{235}F_6$ are shifted slightly toward higher energy with respect to the $V_3$ and $V_4$ bands of $U^{238}F_6$ respectively, but the size of these shifts is small compared to the width of the bands; in other words, the infrared absorption spectra of $U^{238}F_6$ and $U^{235}F_6$ do not exactly coincide, but they overlap at all wavelengths so that if one isotope absorbs light, so, to a substantial degree, will the other. Hence, the infrared excitation of $UF_6$ by absorption of a single IR photon is a process of limited isotopic selectivity.

The second requirement for isotope separation is also a matter of some difficulty for $UF_6$. $UF_6$ molecules which are excited by IR light are no different from molecules which have received the same energy by thermal excitation. Whatever process the photo-excited molecules will undergo, those molecules which are thermally excited to the same energy will also undergo. This dilution of the photo-excited molecules with thermally excited molecules will further decrease the isotopic separation factor.

If the irradiation conditions are such that molecules may acquire the energy of several IR photons then the molecules may be excited to energy levels but little populated by thermal means and dilution of photoexcited molecules by thermally excited molecules is minimized. This advantage of multiple photon absorption is recognized by the prior art as discussed below. It is however, to be recognized that there is more than one way by which multiple photon absorption may be achieved and the isotopic selectivity of the process depends on which way is used.

To achieve multiple photon absorption two difficulties must be overcome. First it is well known that excited molecules may become deexcited by any of several rapid means. Thus if the excitation process is to convert singly excited molecules to doubly excited molecules and thence to triply excited molecules etc., then the excitation process must be rapid compared to the deexcitation processes. This implies that the molecules must be irradiated with infrared light at a high power density.

The second difficulty is more complex. In order to provide light of the required high power density it is necessary to use a laser. Lasers are also noted for their ability to produce light at a single exactly defined wavelength. However in molecular spectroscopy there is an effect known an anharmonicity. Because of this effect a molecule which has absorbed an Ir photon at some wavelength λ to become singly excited, has an absorption spectra which is, in general, shifted toward lower energies. Thus to repeat the absorption step and make the molecule doubly excited a second photon of wavelength $\lambda'$ is needed while to triply excite a third photon of wavelength $\lambda''$ is required.

It is to be understood that all methods for achieving multiple photon absorption have high power requirements, but the quantitive definition of that requirement will vary from method to method. The major distinction in said methods is the means by which anharmonicity is overcome.

The simplest way to overcome the anharmonicity problem is to use a laser which emits not a single exact wavelength but a finite range of wavelengths. The range of wavelengths a laser emits is called the bandwidth. If, in the above example, the bandwidth is sufficient to include $\lambda, \lambda''$ and $\lambda'''$ then clearly a three photon absorption process is possible. In considering the effective bandwidth for multiple photon absorption processes, the well-known effect of power broadening must also be taken into account. In two references known in the prior art this type of multiple photon absorption appears to have been achieved. See Lyman et al, Applied Physics Letters 27, 87, 1975 and Ambartzuminan et al. in Soviet Physics JETP 21, 375, 1975. Both these reference report experiments in which $SF_6$ is dissociated in an isotopically selective manner by high power radiation from a $CO_2$ laser. The conditions used were such that substantial power broadening would occur and since the energy required to dissociate the $SF_6$ molecule is that of many IR photons it is apparent that multiple photon absorption has occurred. It is not completely clear whether power broadening was the sole cause of the multiple photon absorption or whether other and unknown processes may also have contributed.

It will readily be appreciated that for purposes of isotope separation, $UF_6$ and $SF_6$ are entirely nonequivalent substances. According to Klimov and Lobikov, Optics and Spectroscopy, 30, 25 (1971) $S^{32}F_6$ has its $\nu_3$ absorption band at 947 cm$^{-1}$ while $S^{34}F_6$ has its $\nu_3$ absorption band at 930 cm$^{-1}$. Although both bands have a finite width, they do not significantly overlap because of the large 17 cm$^{-1}$ separation. The corresponding $\nu_3$ absorption band in $UF_6$ occurs at 626 cm$^{-1}$ and according to McDowell et al (Journal of Chemical Physics, 61, 3571 (1974), the $\nu_3$ band of $U^{235}F_6$ is shifted by 0.65 cm$^{-1}$ with respect to the $\nu_3$ band of $U^{238}F_6$, however each of the bands has a width at half height of 14 cm$^{-1}$. Thus at any wavelength at which one isotopic uranium molecule absorbs light so will the other to a comparable, although not exactly equal, degree. Thus it is not obvious from the experiments of Ambartzumian et al, that any useful separation of uranium isotopes is possible by photochemical means. Further, this reference neither teaches, shows, nor suggests any means for obtaining a useful photochemical isotope separation in situations where the absorption bands strongly overlap as is the case for $UF_6$.

The process of the instant invention, on the other hand, is especially suitable for the isotopic separation of elements having an atomic number of 70 or greater, i.e., elements wherein the isotope shift is very small and thus the absorption bands overlap.

U.S. Ser. 408,669 and the Continuations-in-part thereof (see above) teach a means by which anharmonicity may be overcome to provide an isotope separation process wherein multiple photon absorption yields an increased isotopic selectivity over the prior art processes based on single photon absorption. In these processes, a second gas is utilized to promote rotational relaxation between the absorption of IR photons. The intervening rotational relocation allows molecules in some rotational state J to absorb a photon at wavelength $\lambda$ and become singly excited, then change their rotational state to J' and absorb a second photon also at $\lambda$ and become doubly excited, change their rotational state to J'' absorb a third photon to become triply excited, etc. It can be shown that the isotopic selectivity with which single photons are absorbed is related to the rotational distribution, thus since the rotational distribution is continually reestablished each step of photon absorbtion may be isotopically selective and the selectivity of the multiple photon absorbtion process may be the result of compounding the selectivity of the individual steps.

The instant invention also teaches a process in which anharmonicity is overcome. Thus the instant process also obtains the increased isotopic selectivity of multiple photon absorption as compared to the isotopic selectivity of the prior art single photon absorption processes in a manner entirely different from that taught in U.S. Ser. No. 408,669 and the Continuations-in-part thereof.

The differences between the process taught in U.S. Ser. No. 408,669 and the Continuations-in-part thereof include: U.S. Ser. No. 408,669 requires the presence of a second gas and the instant invention has no such requirement. In U.S. Ser. No. 408,669 there is no requirement as to the bandwidth of the laser, but for the instant invention a minimum bandwidth of 0.1 cm$^{-1}$ is required. In U.S. Ser. No. 408,669 it is preferred to irradiate the molecules with radiation which falls within the R branch of the molecular absorption band, while the instant invention requires the use of radiation which falls within a P branch of the molecular absorption band.

The reasons for these different requirements will become clear after the instant invention is explained below referring when appropriate to the sole FIGURE of this application which is a representational diagram of the slightly shifted electronic and vibrational states of a pair of isotopes of a polyatomic compound.

The ways in which a molecule may contain energy are called the degrees of freedom. It is well known that molecules have three different kinds of internal degrees of freedom, rotational, vibrational, and electronic. That is, a molecule may contain energy by spinning about its axis, it may contain energy because its atoms are vibrating against each other, and it may contain energy by virtue of having one or more of its electrons in higher energy orbits.

All of these forms of energy are quantized, that is a molecule may hold only certain discrete amounts of energy in each of these forms. In general, for a given molecule the rotational quanta will be the smallest and the electronic the largest. A molecule containing the absolute minimum possible energy would be said to be in the ground electronic, ground vibrational, ground rotational state. Because rotational quanta are very small, rotationally excited states are populated even at very low temperatures. Hence in the FIGURE the ground vibrational state of the ground electronic level is shown not as a single line but as a band because within the ground vibrational, ground electronic state the molecules are distributed among many rotational levels. It is also well known that a molecule in a given rotational state J may absorb infrared radiation and go the next higher vibrational level and either rotational level quantum number $J+1$, rotational level quantum number $J$, or rotational level quantum number $J-1$. Hence for a group of molecules in a thermal equilibrium distribution, there are three distinct absorption processes and the infrared absorption band is composed of three branches, the R branch (transitions in which the rotational quantum number increases by 1), the Q branch (transitions in which the rotational quantum number is not changed), and the P branch (transitions in which the rotational quantum number decreases by 1).

If one irradiates molecules in the ground vibrational state with IR radiation of wavelength $\lambda$ which is within the P branch of an absorption band of the molecule, then molecules in some rotational state $J$ can absorb this radiation and go to the first vibrationally excited state. In the absence of rotational relaxation these singly excited molecules will be in rotational state $J-1$. Since the singly excited molecules are not in a rotational distribution but in a single rotational state, their absorbtion spectra will not be a set of three bands but a set of three lines which may be called the P', Q' and R' absorption lines. Because of anharmonicity the P' line will be shifted to lower energy than the exciting wavelength $\lambda$. The difference in energy between the P' and Q' lines will depend on $J$, which is in turn determined by $\lambda$. Thus there exists a critical wavelength $\lambda$ such that Q' and $\lambda$ may be approximately equal, i.e., equal within 0.1 cm$^{-1}$. Hence if the IR laser has an effective bandwidth greater than 0.1 cm$^{-1}$, the singly excited molecules may absorb a second photon and become doubly excited. In the absence of rotational relaxation the doubly excited molecules will have P", Q" and R" absorbtion lines and the R" line will be within 0.1 cm$^{-1}$ of $\lambda$ so that they may absorb a third photon and become triply excited. If only one IR laser is used the instant invention is limited to imparting the energy of three photons, but a second laser operating at $\lambda^*$ may be used. If $\lambda^*$ lies at lower energy than $\lambda$ by an amount equal to three times the anharmonicity shift, then the above three photon absorbtion process may be repeated to produce molecules with the energy of six photons. A third laser at energy still lower by thrice the anharmonicity shift may produce molecules with the energy of nine photons, etc. Some lasers are capable of emitting several distinct wavelengths at the same time and it is within the scope of the instant invention to use a laser which emits at two or more of the desired wavelengths.

It is convenient to call the above described mechanism of multiple photon excitation the PQR mechanism. If a mixture of vibrational ground state $U^{235}F_6$ and vibrational ground state $U^{238}F_6$ are irradiated at a suitably chosen wavelength $\lambda$ both isotopic molecules may absorb the radiation and become excited, however the $U^{235}F_6$ molecules which absorb the radiation are in rotational state $J$ and may become triply excited via the PQR mechanism while the $U^{238}F_6$ molecules which absorb are in a different rotational state $J'$ and may become singly excited but may not undergo the PQR mechanism. Thus in this ideal case provided that the bandwidth of the laser is greater than the isotope shift the excitation process may be perfectly selective. In practice, however, gaseous $UF_6$ is available as a thermal distribution among many low lying excited states rather than simply the ground vibrational state. For each different vibrational energy level there is a different critical wavelength needed to cause $U^{235}F_6$ to undergo the PQR mechanism. Thus for the thermal distribution as a whole there is a range of wavelengths such that irradiation within this range will cause $U^{235}F_6$ molecules of some energy within the thermal distribution to undergo the PQR mechanism. Said irradiation will also cause $U^{238}F_6$ molecules thermally excited to different and lower energy to undergo the PQR mechanism. The effect of the thermal distribution is that both isotopic molecules may undergo the PQR mechanism and receive the energy of three photons but the light isotope begins with the greater initial thermal excitation and thus finishes with a greater final energy.

After an isotopically selective excitation by absorption of multiple IR photons as described above, the excited molecules undergo a chemical conversion which forms a product which may be recovered by any means known in the art. Since the multiple photon excitation is essentially a means of selectively heating molecules containing one isotope more than molecules containing the other isotope, the chemical conversion which the excited molecules undergo may be any process whose rate or selectivity are sensitive to temperature. It is thus within the scope of the instant invention to allow the excited molecules to undergo bi-molecular reaction with some other gaseous molecules, or to undergo photochemical decomposition by light from a visible or UV laser.

The final step of the instant invention is the recovery of the converted molecules by means known in the art.

There are as indicated above critical requirements for the multiple photon excitation via the PQR mechanism. The molecules must be irradiated at a high enough power density so that the excitation process is faster than rotational relaxtion. This requires a power density of at least $10^4$ watts per cm$^2$ per torr total pressure and preferably greater than $10^6$ watts per cm$^2$ per torr total pressure for the IR irradiation. The IR laser used must have an effective bandwidth taking power broadening into account of at least 0.1 cm$^{-1}$ and it is prefered that the bandwidth be no greater than the isotope shift since use of a bandwidth greater than the isotope shift will somewhat degrade the overall separation. Finally, it is required that the wavelength of the IR laser be within the P branch of an infrared absorbtion band of the molecules which contain the isotopes to be separated. Said infrared absorption band must correspond to a mode of molecular motion in which the atoms of the element whose isotopes are being separated participate. Although said wavelength must be within the P branch it is well known that part of the P branch is heavily overlapped by the Q branch. It is within the scope of the instant invention to use both the portion of the P branch which is not overlapped by the Q branch and that portion which is.

PREFERRED EMBODIMENT

Uranium ore of natural isotopic distribution is converted to $UF_6$ vapor by means well known in the art. Said $UF_6$ is irradiated at a temperature between 225° K and 300° K, with radiation from an IR laser at a power density of at least $10^6$ watts per cm$^2$ per torr total pressure, said radiation having an effective bandwidth of 0.1 to 0.65 cm$^{-1}$ and a wavelength either between 1292 and 1297 cm$^{-1}$ or between 1158 and 1163 cm$^{-1}$, said wavelengths falling within the P branches of the $\nu_1+\nu_3$ and $\nu_2+\nu_3$ absorption bands of $UF_6$. The molecules thus excited are converted by any means whose rate is sensitive to temperature and the converted molecules are collected by means known in the art. Thus the natural uranium is divided into isotopically enriched and deleted uranium. Should greater enrichment of the enriched uranium or greater depletion of the depleted uranium be desired the process may be repeated as needed according to the well-known techniques for staging isotopic separation.

What is claimed is:

1. A method of separating the isotopes of an element, said method being applied to a gaseous compounds of said element, said gaseous compound having an absorption band with P, Q and R branches corresponding to the atom whose isotopes are being separated, the shift in wavelength of said absorption band for molecules of one isotopic form with respect to the same absorption band for molecules of the other isotopic form or forms being sufficiently small so that the absorption bands overlap and there exists a range of wavelengths in which said molecules in all isotopic forms absorb radiation within the P branch portion of said absorption band, such that at all wavelengths wherein one isotopic form absorbs radiation so does the other to a substantial degree, said method comprising subjecting molecules of said compound to radiation from an IR laser at or about a predetermined wavelength at a power density of at least $10^4$ watts per $cm^2$ per torr total pressure, said radiation having an effective bandwidth considering power broadening of more than 0.1 $cm^{-1}$, and being within the wavelength range corresponding to said P branch whereby the molecules containing the lighter isotope or isotopes are preferentially excited and absorb more than 1 quanta of IR radiation, preferentially converting the excited molecules by any means whose rate or selectivity are sensitive to temperature and separating said converted molecules from the molecules which are unconverted.

2. The method of claim 1 wherein said gaseous compound is a compound of uranium.

3. The method of claim 2 wherein the power density is at least $10^6$ watts per $cm^2$ per torr total pressure.

4. The method of claim 3 wherein the bandwidth is greater thqn 0.1 $cm^{-1}$ but less than the isotope shift.

5. The method of claim 4 wherein said gaseous compound is $UF_6$.

6. The method of claim 5 wherein the temperature is between 225 and 300° K.

7. The method of claim 6 wherein the wavelength is between 1292 and 1297 $cm^{-1}$.

8. The method of claim 6 wherein the wavelength is between 1158 and 1163 $cm^{-1}$.

* * * * *